United States Patent [19]
Gamble et al.

[11] Patent Number: 5,406,832
[45] Date of Patent: Apr. 18, 1995

[54] SYNCHRONOUS SAMPLING SCANNING FORCE MICROSCOPE

[75] Inventors: Ronald C. Gamble, Pasadena; Paul E. West, Cupertino; Marc R. Schuman, San Francisco, all of Calif.

[73] Assignee: Topometrix Corporation, Santa Clara, Calif.

[21] Appl. No.: 86,592

[22] Filed: Jul. 2, 1993

[51] Int. Cl.⁶ .................. G01B 5/28; G01N 23/00
[52] U.S. Cl. ...................... 73/105; 250/306; 250/307
[58] Field of Search ............... 73/105; 250/306, 307

[56] References Cited

U.S. PATENT DOCUMENTS

| | | | |
|---|---|---|---|
| Re. 33,387 | 10/1990 | Binnig | 250/307 X |
| 2,728,222 | 12/1955 | Becker et al. | 73/105 |
| 2,885,660 | 5/1959 | Hecox et al. | 73/105 |
| 3,529,240 | 9/1970 | Sanders | 73/105 |
| 3,720,818 | 3/1973 | Spragg et al. | 73/105 |
| 4,724,318 | 2/1988 | Binnig | 250/307 X |
| 4,941,753 | 7/1990 | Wickramasinghe | 250/307 X |
| 4,954,704 | 9/1990 | Elings et al. | 250/307 |
| 5,038,322 | 8/1991 | Van Loenen | 250/306 X |
| 5,051,585 | 9/1991 | Koshishiba et al. | 250/306 |
| 5,144,128 | 9/1992 | Hasegawa et al. | 250/307 X |
| 5,146,089 | 9/1992 | Rosier | 250/309 |
| 5,168,159 | 12/1992 | Yagi | 250/307 X |
| 5,229,606 | 7/1993 | Elings et al. | 250/307 X |
| 5,237,859 | 8/1993 | Elings et al. | 73/105 |
| 5,262,643 | 11/1993 | Hammond et al. | 73/105 X |
| 5,267,471 | 12/1993 | Abraham et al. | 73/105 |
| 5,274,230 | 12/1993 | Kajimura et al. | 250/307 X |
| 5,283,442 | 2/1994 | Martin et al. | 250/307 X |
| 5,289,004 | 2/1994 | Okada et al. | 250/306 |

FOREIGN PATENT DOCUMENTS

| | | | |
|---|---|---|---|
| 249910 | 10/1990 | Japan | 73/105 |
| 1207597 | 10/1970 | United Kingdom | 73/105 |
| 316923 | 5/1972 | U.S.S.R. | 73/105 |
| 1352207 | 11/1987 | U.S.S.R. | 73/105 |

*Primary Examiner*—Hezron E. Williams
*Assistant Examiner*—Daniel S. Larkin
*Attorney, Agent, or Firm*—Fulwider Patton Lee & Utecht

[57] ABSTRACT

The synchronous sampling scanning force microscope includes a reflective cantilever arm having a free end which is oscillated at a frequency different from the resonance frequency of the cantilever arm. The motion of the oscillating cantilever arm is measured, to generate a deflection signal indicative of the amplitude of deflection or phase shift of the cantilever arm. Selected portions of cycles of the output signal are sampled, for generating output signal data indicative of deflection of the near and far excursions of the probe. The method and apparatus permit monitoring of compliance of the surface of the specimen by multiple sampling at a rate greater than the period of oscillation of the cantilever probe of the microscope.

57 Claims, 10 Drawing Sheets

SYNCHRONOUS SAMPLING SCANNING FORCE MICROSCOPE

BACKGROUND OF THE INVENTION

1. Field of the Invention

This invention relates generally to scanning force microscopes, and more particularly concerns a scanning atomic force microscope with an oscillating cantilever probe, and a synchronous sampling detection method of generating data points for imaging surface contours of a specimen.

2. Description of Related Art

Scanning force microscopes, also known as atomic force microscopes, are useful for imaging objects as small as atoms. Scanning force microscopy is closely related to scanning tunneling microscopy and the technique of stylus profilometry. However, in a scanning force microscope, a laser beam is typically deflected by a reflective lever arm to which the probe is mounted, indicative of vertical movement of the probe as it follows the contours of a specimen. The deflection of the laser beam is typically monitored by a photodetector in the optical path of the deflected laser beam, and the sample is mounted on a stage moveable in minute distances in three dimensions. The sample can be raster scanned while the vertical positioning of the probe relative to the surface of the sample is maintained substantially constant by a feedback loop with the photodetector controlling the vertical positioning of the sample.

The interactive forces between the probe and surface of the specimen change at different distances. As the probe approaches the surface of an uncontaminated specimen, it is initially attracted to the surface by long range attractive forces, such as van der Waals forces. As the probe tip approaches further, repulsive forces from the electron orbitals of the atoms on the probe tip and the specimen surface become more significant. Under normal ambient conditions, the surface of a specimen will also be covered by a thin contamination layer, typically composed of water and other ambient contaminants, and contaminants remaining from production of the specimen. The thickness of the contamination layer can vary due to humidity and specific ambient conditions, but is generally between 25 and 500 Å. This contamination layer can also have an interactive effect on the probe tip. As the probe tip approaches the contamination layer of a specimen, capillary surface forces can strongly attract the probe tip toward the surface of the specimen. When the probe tip is being retracted from the surface of the specimen, the capillary attraction forces can also strongly resist retraction of the probe tip from the surface of the specimen.

In conventional non-modulated modes of operating atomic force microscopes, where the lever arm is not oscillated, output from the detector monitoring the deflection of the reflective probe lever arm is typically used as feedback to adjust the position of the probe tip to maintain the interactive forces and distance between the probe tip and specimen surface substantially constant. In a conventional non-modulated, DC-contact mode of operation, the detected displacement of the probe is used in a feedback loop to adjust the position of the probe so that the force between the probe and the specimen surface remains substantially constant. The "constant force" mode can be used with a slow scan, but if a sufficiently rapid scan is executed, the feedback loop may not be able to keep up with the changes in the features of the surface of the specimen to be able to adequately maintain a constant force. In a non-modulated "non-contact" operating mode, the probe is maintained in the attractive region near the surface of the specimen, being attracted to the surface of the specimen primarily by capillary attractive forces from contaminated specimens, or by van der Waals forces from uncontaminated specimens. When the "non-contact" mode of operation is used without oscillating the lever arm, as long as the probe tip is in contact with the specimen surface, the "non-contact" mode is substantially identical to the DC-contact imaging mode. In such non-modulated "non-contact" modes of operation, the feedback loop may also not be adequate to accurately position the probe tip at high scan rates.

In modulated modes of operating a scanning force microscope, the reflective lever arm is typically mounted to a piezoelectric ceramic material which can be driven by an alternating voltage to cause the lever arm and the probe tip to oscillate at a desired frequency. In modulated "non-contact" and "intermittent contact" scanning modes, as the oscillating probe tip approaches the surface of the specimen, both the amplitude and phase shift of the probe relative to the driving oscillator are perturbed by the surfaces forces. Measurements are typically made of the average cantilever amplitude or the shift in phase of the cantilever relative to the driven oscillation, in order to monitor the interaction of the tip with the attractive and repulsive forces of the surface of the sample, generally due to a contaminant layer on the surface of the sample, in ambient, open air conditions. Either the change in amplitude or the change in phase can also be used in a positioning feedback loop of a scanning force microscope. Conventional methods of averaging measurements of the change in amplitude or phase over several oscillations of the cantilever are satisfactory for obtaining topographical image data at low speed scan rates. However, in order to achieve satisfactory resolution at high speed scanning, it would be desirable to utilize individual, unaveraged measurements of amplitude or phase shifts for generating topographical image data. There is an increasing need for real-time imaging, particularly for applications such as scanning force microscope electrochemistry, and scanning of living biological specimens. At higher scan rates, the reflective lever arm oscillating frequency must approach the physical limits of the lever arm design, and the data sampling times must be minimized.

In a conventional high amplitude resonance modulation mode, in which the probe is oscillated at its resonant frequency, typically at 50–500 kHz, at a high amplitude of from 100 to 1,000 Å, the probe has intermittent contact with the surface of the specimen, rapidly moving in and out of the contamination layer. In this mode, the topographical image is not significantly affected by the contamination layer, since the probe rapidly penetrates this layer. Either the probe or the sample can be damaged in this mode, which is more appropriate for imaging soft specimens. In a conventional low amplitude resonance mode, in which the probe tip is also typically oscillated at it resonance frequency at from 50–500 kHz at a low amplitude, the probe remains within the contamination layer, in the attractive region. However, since the contamination layer can change, due to warming of the specimen, changes in humidity or other ambient surface conditions, images made with in this mode of operation can also change.

Resonance modes of operation also present special problems, in that changes in amplitude and phase during oscillation of the lever arm due to long and short range forces occurring between the tip and the surface of the sample are most greatly affected when the frequency is at or near the fundamental resonance frequency. At resonance, the oscillation is quickly damped when the probe tip is at or near the sample surface. The quality factor, Q, of the oscillating lever arm at resonance, further increases the effect of the interacting surface forces on the amplitude and phase shift. For a single optical lever arm made of silicon (100 microns long, 15 microns wide, 6 microns thick), the resonance frequency is about 300 Khz, and the Q factor is well over 100 in air. However, operation of a scanning force microscope with a lever arm having a high Q factor in "non-contact" mode at the resonance frequency can cause "ringing" problems, reducing frequency response. Consequently, conventional resonance modes of operation typically result in low resolution imaging of the surface of a specimen.

Utilization of unaveraged individual measurements of amplitude or phase shift changes of oscillation of the probe in modulated modes of operation can also present special problems of increased noise and differences in interaction of the probe tip with a surface contamination layer during near and far excursions of the probe tip relative to the surface of the specimen. It would be desirable to provide a way of overcoming problems of noise and differences in interaction of the probe tip during near and far excursions to provide for high resolution imaging at high scan rates.

For specimens having a surface in which the compliance changes, compliance measurements can also be useful in providing enhanced contrast in analyzing topographic images. Compliance of the surface is typically measured by successive application of increasing force of an atomic force microscope probe from point to point, starting each measurement with the probe tip off the surface. As such sampling results in a slow scan, it would be desirable to perform multiple force measurement sampling at a rate greater than the probe oscillation frequency, to provide multiple sampling during the period of each oscillation, to monitor compliance of the probe tip on the surface of the specimen. The invention addresses these needs.

SUMMARY OF THE INVENTION

Briefly, and in general terms, the present invention provides for a scanning force microscope with an oscillating cantilever probe, and a synchronous sampling detection method for using the microscope which allows high speed scanning of surface contours of a specimen for producing an image of the specimen surface contours. The method and apparatus of the invention permit monitoring of compliance of the surface of the specimen by multiple sampling at a rate greater than the period of oscillation of the cantilever probe of the microscope. The method of the invention can be used with any method for sensing a signal proportional to the position of the probe tip at the end of the cantilever.

The invention accordingly provides for a synchronous sampling scanning force microscope for examining surface contours of a specimen, the microscope having a body including a reflective cantilever arm having a first end secured to the body and a free end which is oscillated at a desired frequency which is preferably different than the resonance frequency of the cantilever arm. A probe is secured to the free end of the cantilever arm, and includes a probe tip adapted to follow the surface contours of the specimen with a substantially constant amount of force. Scanning means are provided for mounting the specimen for examination and for scanning the specimen relative to the probe tip. Means are provided for measuring the motion of the oscillating cantilever arm, operating to generate a deflection signal indicative of the amplitude of deflection or phase shift of the cantilever arm. The means for measuring the motion of the oscillating cantilever arm preferably comprises laser light source means mounted to the body for producing a focused laser beam directed at and deflected by the reflective cantilever arm, with photodetector means mounted to the body for receiving the laser beam deflected by the cantilever arm. Means are provided for sampling selected portions of cycles of the deflection signal corresponding to cycles of motion the probe tip, for generating output signal data or phase shift data indicative of elevation of the surface contours of the specimen.

The invention also provides a method for synchronous sampling detection of an oscillating cantilever of the scanning force microscope for examining surface contours of a specimen, generally by the steps of oscillating the free end of the cantilever arm to cause the probe tip to oscillate toward and away from the specimen surface contours at a desired frequency preferably different than the resonance frequency of the cantilever arm of the microscope, sampling selected portions of cycles of the deflection signal corresponding to the cycles of near and far excursions of the probe tip, generating output signal data indicative of elevation of the surface contours of the specimen, controlling the phase of sampling of the selected portions of cycles of the output signal, and storing the output signal data for displaying an image of the surface contours of the specimen based upon the output signal data.

These and other aspects and advantages of the invention will become apparent from the following detailed description, and the accompanying drawings, which illustrate by way of example the features of the invention.

DETAILED DESCRIPTION OF A PREFERRED EMBODIMENT

Figure 1:
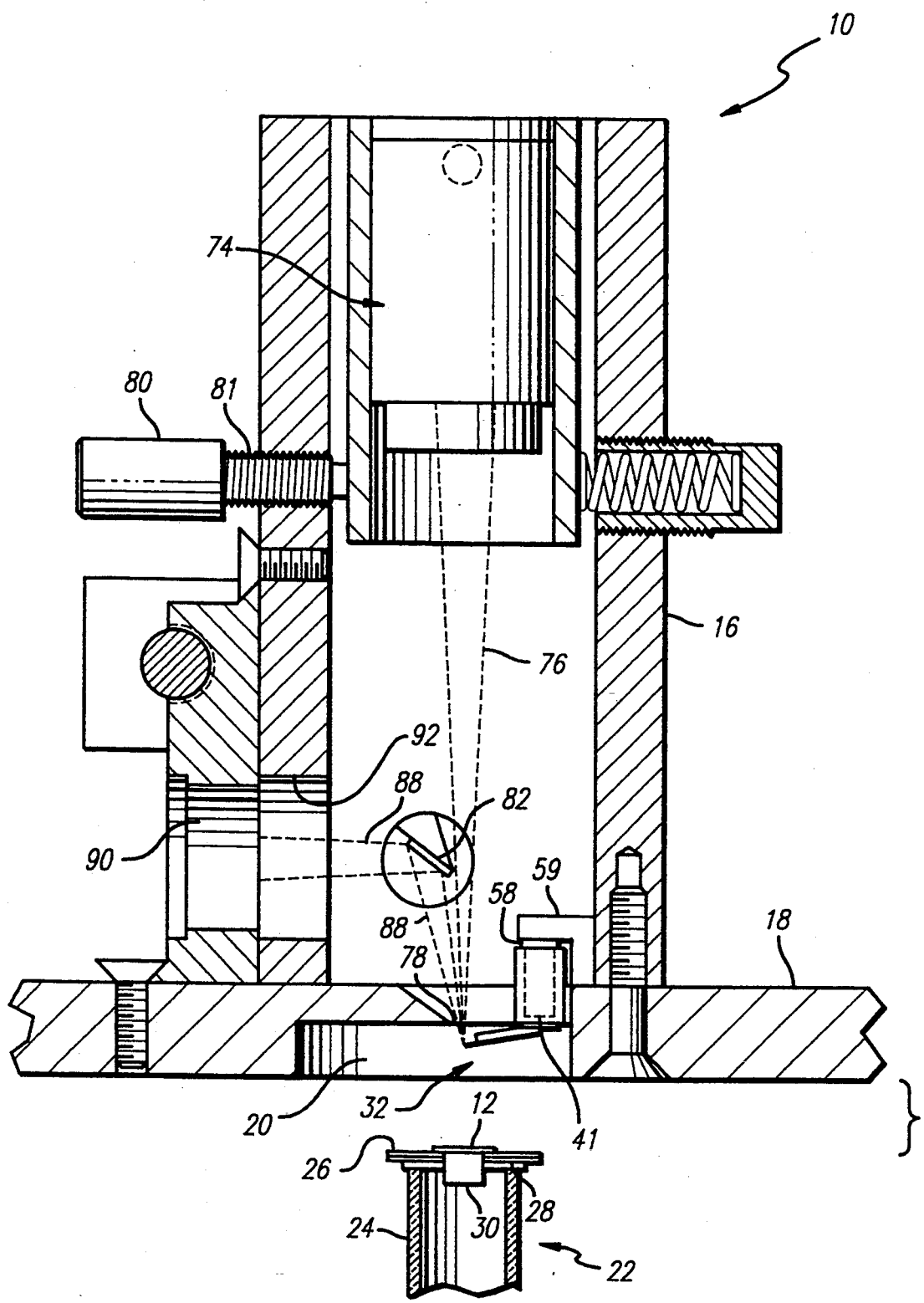
FIG. 1 is a sectional view of a synchronous sampling scanning force microscope of the present invention.

In modulated "non-contact" and "intermittent contact" scanning modes of scanning force microscopes, measurements of the change in amplitude or phase are typically averaged over several oscillations of the cantilever, which is unsatisfactory for obtaining topographical image data at high speed scan rates. In high amplitude resonance modulation and low amplitude resonance, changes in amplitude and phase during oscillation of the lever arm due to long and short range forces occurring between the tip and the surface of the sample are greatly affected when the frequency is at or near the fundamental resonance frequency. At resonance, the oscillation is quickly damped when the probe tip is at or near the sample surface. Operation of a scanning force microscope with a lever arm having a high Q factor at the resonance frequency can also cause "ringing" problems, reducing frequency response.

Unaveraged individual measurements of amplitude or phase shift changes of oscillation of the probe incur increased noise and differences in interaction of the probe tip with a surface contamination layer during near and far excursions of the probe tip relative to the surface of the specimen. The present invention provides for synchronous sampling of amplitude or phase shift of near and far excursions of an oscillated cantilever arm and probe tip oscillated at a frequency substantially different from the resonant frequency of the cantilever arm to overcome these problems.

As is illustrated in the drawings, and with particular reference to FIGS. 1, 2, 5 and 6, the invention is embodied in a synchronous sampling scanning force microscope 10 for examining the surface contours 11 of a specimen 12, which is generally less than ½ inch in diameter and 0.1 to 2 mm thick. The surface of the specimen is typically covered with a contamination layer 14 in normal ambient conditions, which represents an attractive region 15 primarily due to surface attraction of the probe tip of the scanning force microscope.

Figure 2:
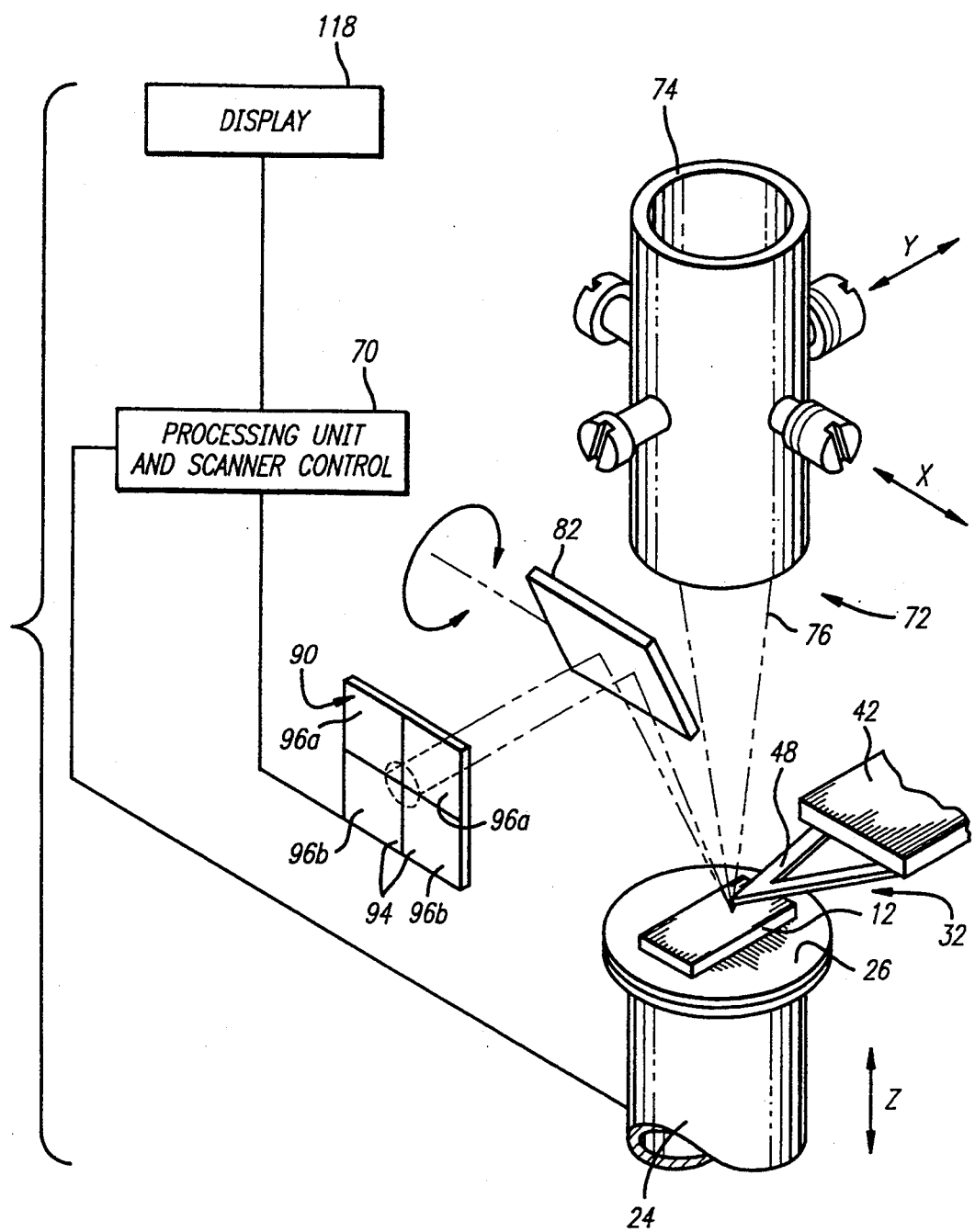
FIG. 2 is an exploded diagrammatic perspective view illustrating the spatial relationships of major elements of the synchronous sampling scanning force microscope of the present invention.

Referring to FIGS. 1 and 2, the synchronous sampling scanning force microscope of the invention includes a stationary body 16 having a removable lower base 18 secured to the body by screws or bolts, with a chamber 20 for receiving the specimen. The body is typically supported by a stationary support (not shown) also supporting a scanning means 22 for mounting of the specimen for examination, raster scanning the specimen in X and Y directions relative to the body, as shown by the arrows, that is, horizontally in two dimensions or degrees of freedom, and for moving the specimen in a vertical or Z dimension or degree of freedom relative to the body, as shown by the arrow, and as will be further explained. The scanning means is thus stationarily mounted with respect to the body of the microscope, and can also be secured to the body. The scanning means can for example comprise a piezo tube 24 with a support stage 26 for the specimen at the distal end 28 of piezo tube, which is typically driven in the X, Y and Z dimensions by electrical drive voltage signals from a control unit, as is further discussed below.

The stage also may include a magnet 30, to allow a specimen to be mounted by adhesion onto a small magnetic steel plate which can thus be magnetically secured on the top of the stage, allowing for the convenient interchange of specimens to be examined by the instrument.

Figure 3:
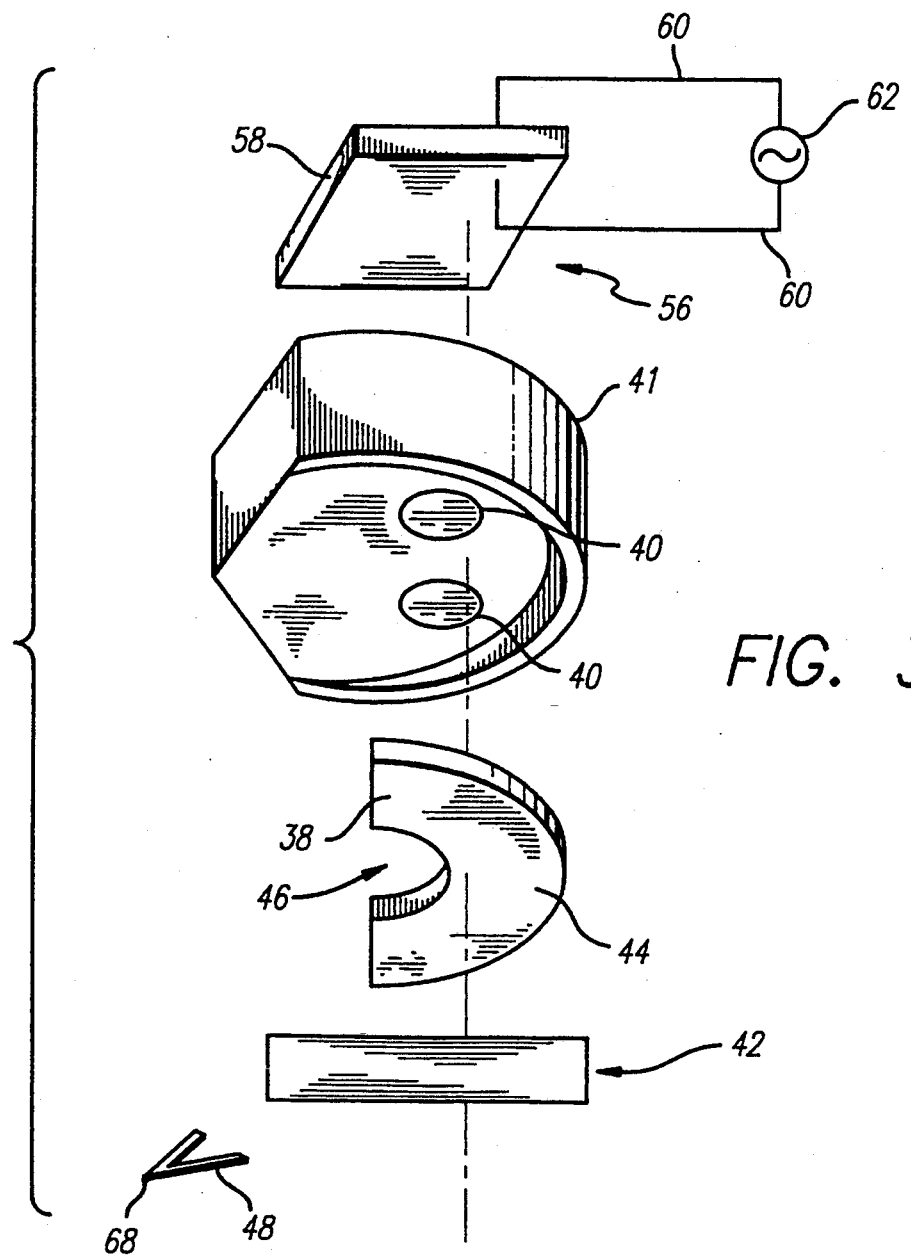
FIG. 3 is an enlarged, exploded view showing the mounting of the optical lever arm assembly of the scanning force microscope of the invention.
Figure 4:
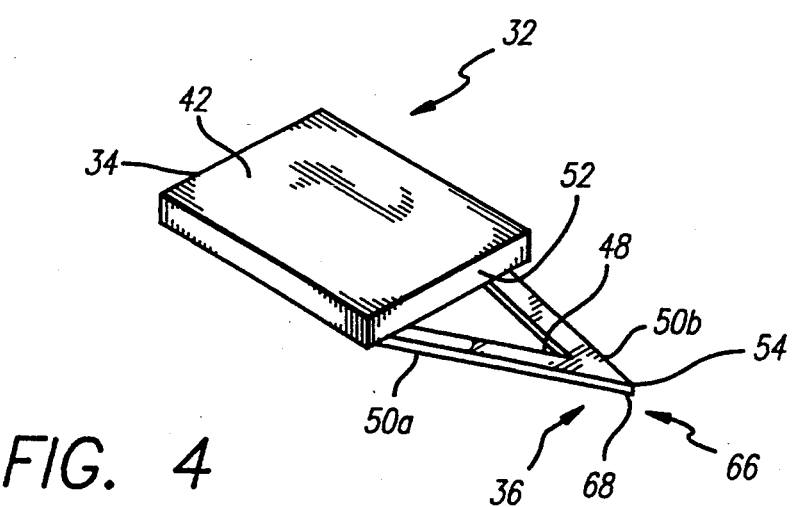
FIG. 4 is an enlarged perspective view of the integral support member, cantilever arm, and probe tip of the optical lever arm assembly of the present invention.

As is best illustrated in FIGS. 2, 3 and 4, the microscope includes an optical lever arm assembly 32 having a first end 34 secured to the body, and a free end 36. The optical lever arm assembly is preferably secured to the body of the microscope by a half washer member 38 of magnetic steel, which can be readily magnetically secured to one or more magnetized portions 40 mounted to the microscope body, and currently preferably disposed in a cantilever holder member 41. An integral cantilever support member 42 is also currently preferably mounted to a central portion 44 of the half washer member, extending to the open middle portion 46 of the half washer member. A reflective cantilever arm 48 is carried by the integral cantilever support member. An oscillation drive means 56 is also preferably provided, and currently preferably comprises a piezo-ceramic transducer 58, secured between a piezo holder member 59, which is mounted to the body or to the base, and the cantilever holder member. The piezo-ceramic transducer is preferably driven by oscillating voltage conducted by electrical lines 60 connected to a voltage oscillator 62, for oscillating the cantilever arm at a desired frequency. The reflective cantilever arm 48 is currently preferably formed in the shape of a triangle from first and second arms 50a, 50b, and is preferably secured at one end to the oscillator drive means 56 at the free end 52 of the integral cantilever support member, and the arms of the cantilever arm are joined together at their free ends 54.

The reflective cantilever arm preferably has a high stiffness, offering a high resonance frequency, for operating at video rates. The arms of the cantilever arm are typically about 18 microns thick and about 200 microns long, and are secured to the integral cantilever support member about 120 microns apart. Although the silicon nitride material (available from Park Scientific Instruments) from which the cantilever arm is made is normally considered quite rigid, with these dimensions the cantilever arm bows and flexes as much as 30°, amplifying the deflection of the laser beam. The cantilever arm typically has a very high fundamental resonance frequency, as will be further explained below. The integral cantilever support member and the reflective cantilever arm are so small that they are most conveniently etched from silicon nitride, although other materials such as silicon which can be etched or lend themselves to fine machining and which can provide a reflective surface, such as are well known to those skilled in the art of manufacturing of integrated circuit chips, may be suitable as well.

Attached to the free end 54 of the cantilever arm is a probe means 66 including a distal needle-like probe tip 68 adapted to contact or follow the surface contours of the specimen. The microscope preferably also includes a processing unit with feedback control means 70 for driving the piezo tube in the vertical or z dimension as the probe tip traverses the contours of the specimen, to maintain a substantially constant force of the probe means against the surface of the specimen even as the probe oscillates against the surface of the specimen.

Figure 9:
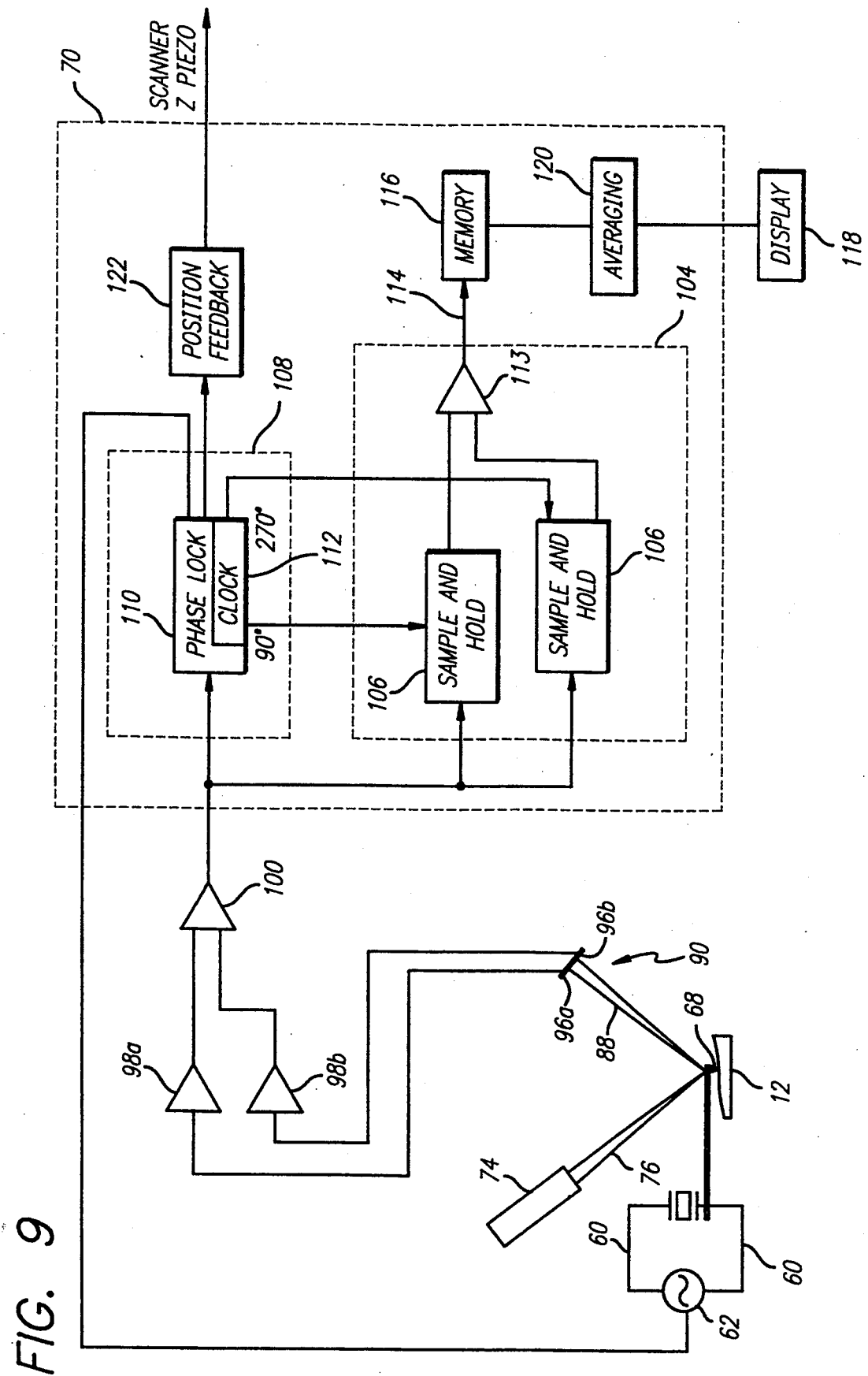
FIG. 9 is a schematic diagram of the synchronous sampling scanning force microscope of the present invention.

With reference to FIGS. 1, 2 and 9, deflection measuring means 72 are also mounted to the body of the microscope for measuring deflection of the probe and cantilever arm as they oscillate. In a preferred embodiment, the deflection measuring means includes a laser light source means 74 such as a laser diode with associated optics, mounted in the upper portion of the body for producing a focused laser beam 76 directed at and deflected by the reflective cantilever arm. One preferred laser diode is a 3 milliwatt laser diode which produces a beam in the 670 nm range, and is commercially available. An opening 78 or transparent window is provided in the removable base to allow the laser beam to pass through to the cantilever arm. Adjustment screws 80 may be provided for adjusting the alignment and aiming of the laser light source, mounted in threaded access ports 81 provided in body. A reflective means such as the planar mirror 82 is preferably mounted in the interior of the body at a distal end of an adjustment screw (not shown) through a threaded access port to reflect the deflected beam 88 to a photodetector 90 mounted to the body of the microscope for receiving the deflected laser beam. The photodetector preferably generates an electrical deflection signal 102 in response to the deflected laser beam indicative of an amount of deflection of the laser beam by the cantilever arm.

As is shown in FIG. 2, the photodetector is preferably mounted to the body of the microscope to receive the deflected laser beam through photodetector port 92 in the body, and is typically formed as an array of four photosensors 94, in which the top pair 96a is coupled to provide a combined signal, and the bottom pair 96b is coupled to provide a combined signal, with the two combined signals being received by preamplifiers 98a,b and differential amplifier 100 to provide a combined deflection signal 102.

The deflected laser beam is typically targeted at a central point between the top and bottom portions of the photodetector, and the combined signals from these portions are processed in the processing unit 70 to generate topographical position signals for imaging the surface of the specimen, and for feedback control of a z piezo (not shown) of the scanning means, well known in the art.

Figure 7:
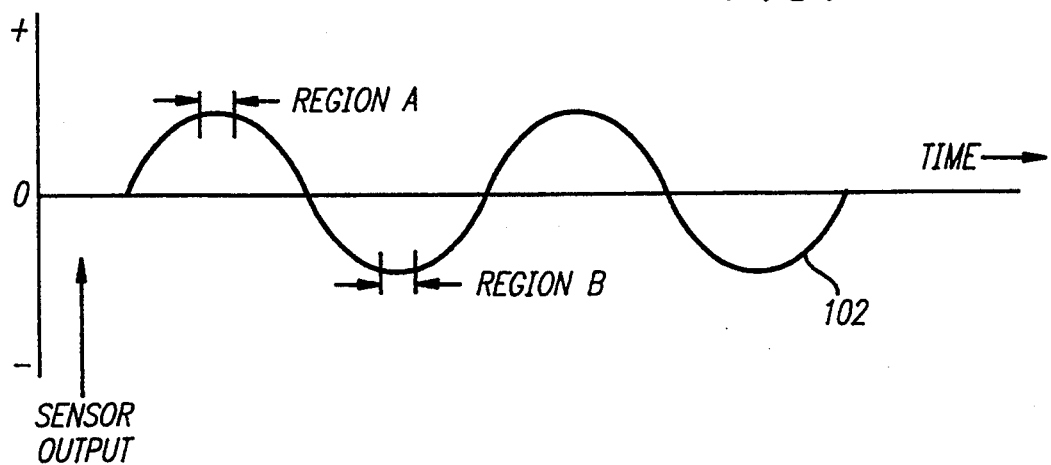
FIG. 7 is a graph of an idealized waveform of the deflection signal indicative of motion of the oscillating cantilever arm of the synchronous sampling scanning force microscope of the present invention.
Figure 8:
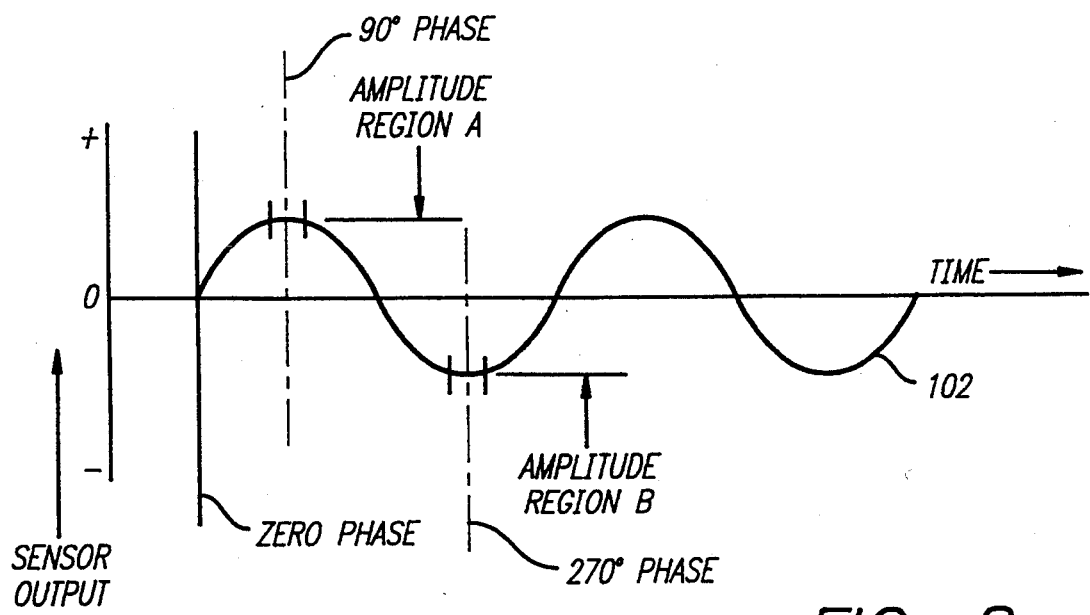
FIG. 8 is a graph of an exemplary waveform of the deflection signal indicative of actual motion of the oscillating cantilever arm interacting with a surface region of a specimen.

An oscillating cantilever arm of the type typically used in non-contact and intermittent contact modes of scanning force microscopy generally oscillates in a sinusoidal wave form, with a frequency determined by the oscillator driver, as illustrated in FIG. 7, showing an idealized wave form of a cantilever arm unperturbed by a nearby surface forces. The far excursion of the oscillating cantilever arm relative to the surface of the specimen is represented by region A, and the near excursion is represented by region B. In "non-contact" and "intermittent contact" scanning modes using an oscillating cantilever, as the oscillating cantilever probe tip approaches the sample surface, the wave motion of the cantilever arm relative to the driving oscillator is perturbed at any given frequency, as illustrated in FIG. 8. This perturbation is due to a combination of the long and short range forces which occur between the tip and the surface of the sample, and affects both the amplitude and phase shift of the wave motion of the cantilever arm. At resonance, the oscillation is quickly damped when the probe tip is at or near the sample surface. The damping effect is lessened when the cantilever arm is oscillated at a frequency substantially different from the fundamental resonance frequency, resulting in an asymmetrical wave form shape. The lower, near excursion portion, region B, becomes flattened as the probe tip interacts with the surface of the specimen. The apparatus and method of the invention provide for synchronous sampling of the amplitude or phase shift of the far and near maximum excursions of the cantilever arm in regions A and B of the cantilever arm wave form, to indicate the degree of interaction with the surface of the specimen, and to generate a deflection signal which can be used in providing feedback to the z-piezo of the scanner and for determining topographical data for imaging the surface features of the specimen.

With reference to FIG. 9, illustrating a simplified block diagram of the synchronous sampling scanning force microscope of the invention, the processing unit 70 preferably includes sampling means 104 for sampling selected portions of cycles of the deflection signals, and for generating amplitude or phase shift signals indicative of the amplitude or phase shift of the far and near excursions of the oscillating cantilever arm. The sampling means preferably includes circuitry to allow sampling of at least the far and near maximum excursions of the motion of the cantilever arm for generation of scanner position feedback and for imaging data, and may advantageously allow sampling of the motion of the cantilever arm at one or more other times during each cycle, which is useful for determining compliance of the specimen, at a rate greater than the cantilever oscillation period. Thus, the sampling means preferably includes dual sample and hold amplifiers 106 for sampling regions A and B at 90° and 270° of each cycle, and can advantageously include additional sample and hold amplifiers for measuring amplitude or phase shift of the deflection signal at other portions of the wave cycle.

The times for sampling of the deflection signal are kept in phase with the upper portion, region A, and the lower portion, region B, of oscillation of the cantilever arm, by the processing unit by a phase control means 108 having clock phase outputs of 90° and 270°. The phase control means 108 is connected to the means for measuring motion of the cantilever arm for receiving the deflection signal, and is connected to the sampling means for controlling the sampling of the selected portions of cycles of the deflection signal. The phase control means preferably comprises a phase lock loop amplifier 110 and clock output means 112 preferably connected to the phase lock loop amplifier and to the sample and hold amplifiers, for controlling the sample and hold amplifiers for sampling at intervals of 90° and 270° phases of each cycle. The sampling means also preferably includes differential amplifier means 113 receiving the output of the sample and hold amplifiers for determining the topographical image output signal 114 as the difference between the measured amplitude or phase shift at the far maximum excursion at 90° and the near maximum excursion at 270°. The processor unit preferably also includes memory means 116 connected to receive and store the topographical image output signal data, for displaying the image of the surface of the specimen on a display means 118 connected to the processor unit.

As is illustrated in FIG. 9, the processing unit may also include averaging means 120 for averaging successive data points to generate an image on the display. The averaging means can for example be operative to average individual topographical image output signal data by determining the root mean square of voltage of groups of successive data points of the signal data, or by averaging data points of a plurality of images on a pixel by pixel basis.

Figure 5:
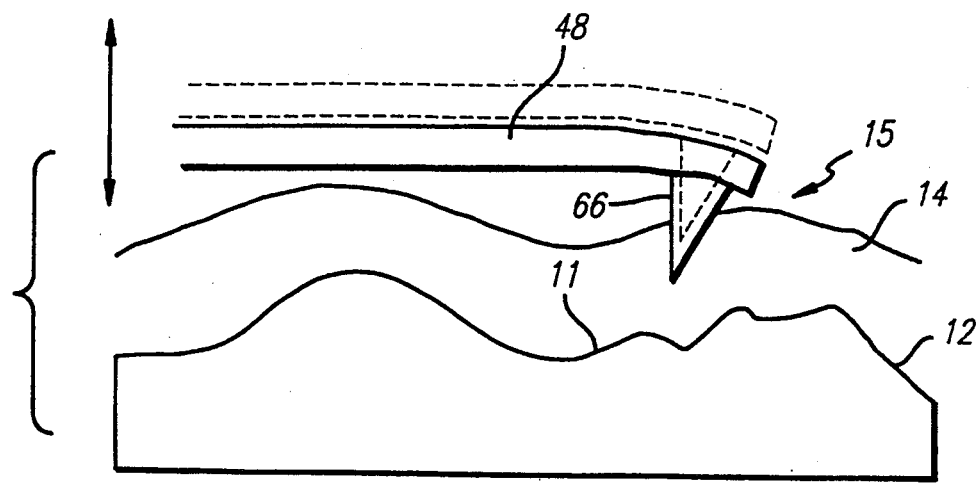
FIG. 5 is an illustration of motion of the oscillating cantilever arm and probe maintained within the attractive region of the surface of a specimen in the method of the invention.
Figure 6:
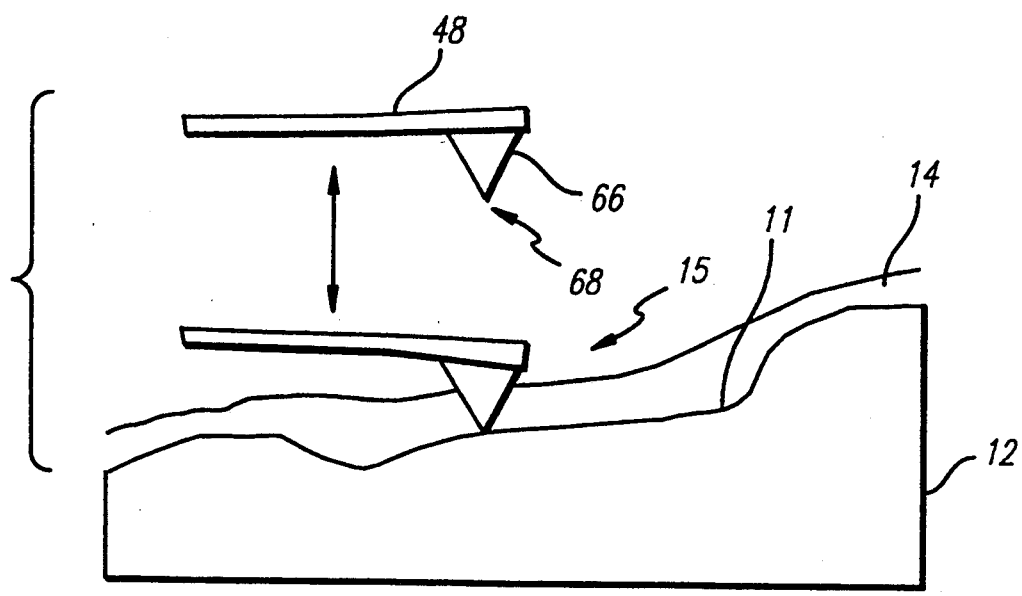
FIG. 6 is an illustration of motion of the oscillating cantilever arm and probe maintained in intermittent contact with the surface of a specimen in the method of the invention.

The processing unit also preferably includes position feedback control means 122 connected to the sampling means and the scanning means, for generating a position feedback signal for positioning the probe tip a desired distance from the surface of the specimen. In a non-contact scanning mode, the feedback control means may operate to maintain the probe tip in the attractive region of the specimen surface, as is illustrated in FIG. 5, and in an intermittent contact scanning mode, the feedback control means may operate to maintain the probe tip in intermittent contact with the contamination layer, as is illustrated in FIG. 6. The probe position control feedback means is electrically connected to the scanning means for raising and lowering the specimen with respect to the probe tip for increasing or decreasing the force of the probe tip against the specimen surface to maintain the substantially constant average amount of force of the probe tip against the specimen surface.

Figure 10:
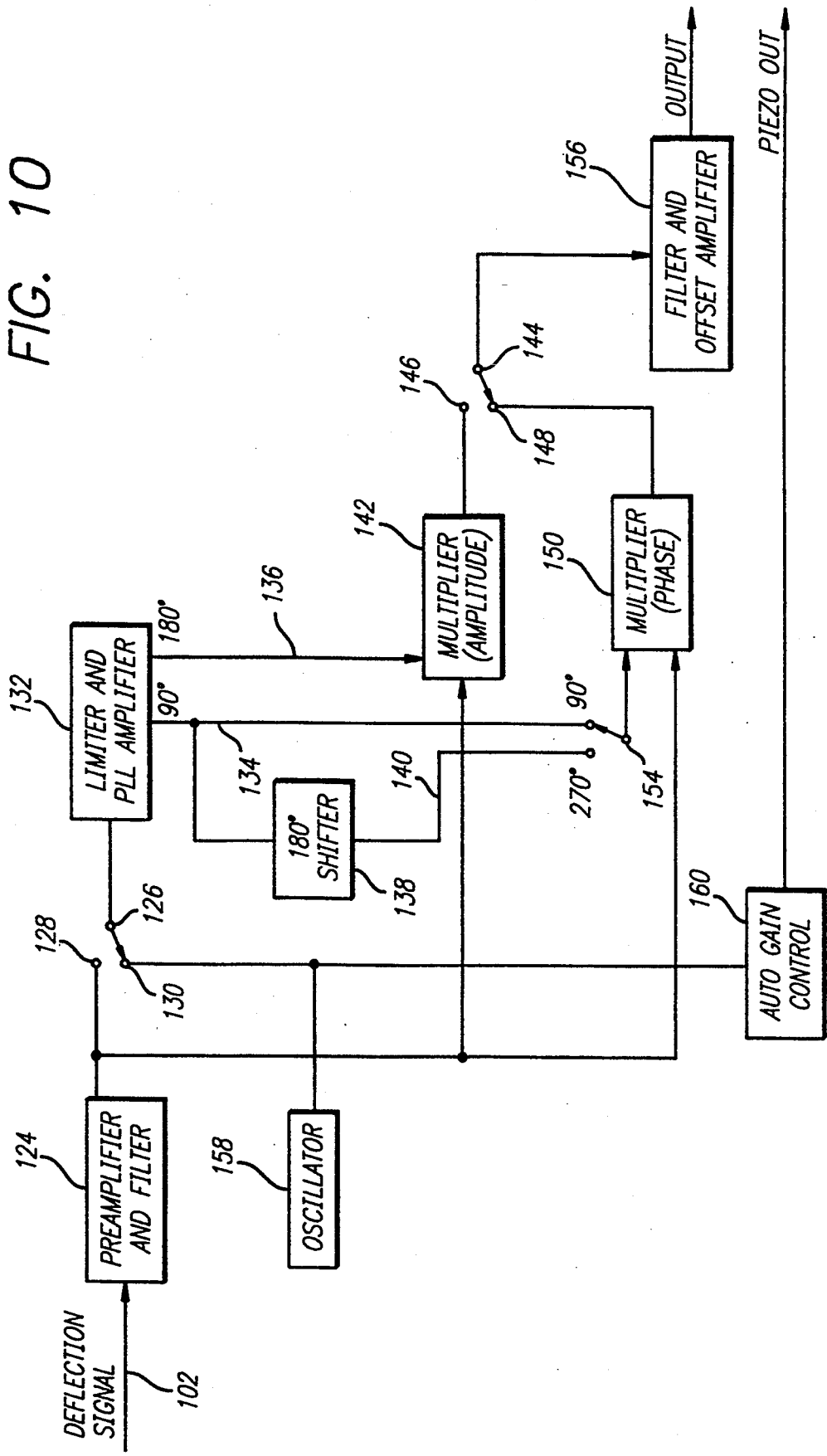
FIG. 10 is a schematic diagram of an alternate amplitude and phase shift detection circuit for use in the synchronous sampling scanning force microscope of the present invention.

In another preferred embodiment illustrated in the simplified block diagram of FIG. 10, the processing unit may include circuitry enabling the microscope to monitor the cantilever oscillation by either a signal proportion to the amplitude of the oscillating cantilever arm, or a signal which measures the phase shift of the cantilever arm in non-contact mode. In non-contact mode, an oscillating cantilever arm tends to oscillate at a fundamental resonance frequency. The resonance frequency is generally determined by composition, geometry and size of the cantilever arm. When a force interacts with the probe tip of the oscillating cantilever arm at a given distance, the resonance frequency is shifted by an amount (delta f) which can be calculated by the following equation:

$$\text{delta } f = F' \times f(res)/2k$$

where F' is the derivative of the force acting on the tip, and k is the force constant of the cantilever arm. In the attractive region near the surface of a specimen, F' will be negative, and the resonance is shifted lower. The interactions at the surface of the specimen also markedly reduce the amplitude of the oscillation of the cantilever arm. While it is currently preferred to measure the change in amplitude of the oscillation of the cantilever arm at a frequency substantially different from resonance, and preferably less than the resonance frequency, it is also possible to maintain the amplitude of oscillation relatively constant in the non-contact mode, for measuring the phase shift of the cantilever arm, which can be used to generate topographical data points, and can be used in a feedback loop in the processing unit to the scanner to maintain a constant distance of the probe tip from the surface of the specimen.

Thus, for example, in non-contact mode, in the simplified block diagram of circuitry in FIG. 10, the deflection signal 102 is received by a preamplifier and filter 124 in the processing unit, and directed to a first switch 126 having an amplitude position 128 and a phase position 130. The switch is connected to the limiter and phase lock loop amplifier 132, having a 90° phase output clock 134 and a 180° phase output clock 136 for generating clock signals synchronized with the deflection signal cycle. The 90° output clock is also connected to a 180° phase shifter 138 for generating a 270° clock signal 140. The 180° clock signal is received by the amplitude multiplier 142, which also receives the deflection signal from the preamplifier. The amplitude multiplier generates an amplitude signal directed to the second switch 144, having an amplitude position 146 and a phase position 148 receiving a phase signal from phase multiplier 150, connected to receive the deflection signal from the preamplifier and from the 90° position 152 or from the 270° position 140 of the third switch 154. The filter and offset amplifier 156 receives amplitude or phase signal input from the second switch 144. The oscillator 158 is connected to direct the oscillation signal to the phase position 130 of switch 126 to the phase lock loop amplifier 132, and to the auto gain control 160, which maintains a constant amplitude of oscillation of the cantilever when the phase shift signal is used. The DC portion of the deflection signal is used to monitor the absolute deflection of the cantilever for alignment purposes, and the AC signal is processed through the phase sensitive amplifier and associated circuitry. The resulting amplitude signal which is proportional to the amplitude of the oscillating cantilever, and the resulting phase signal measuring the change in the oscillation frequency of the cantilever offer two methods for monitoring the cantilever oscillation.

With reference to FIGS. 11-14, illustrating an alternate free standing type of scanning force microscope implementing the principles of the invention, the free standing synchronous sampling scanning force microscope of this embodiment has a stationary body 212 including a lower base 214. The base is secured to the body by screws or bolts, with adjustable motor driven legs 216a,b,c for supporting the body of the microscope on a substrate 213 and moving the body of the microscope in a vertical dimension relative to a specimen 218 mounted with respect to the substrate. Each of the motor driven legs includes an optically encoded screw drive motor 217 connected to a control unit, as is described later, which coordinates the operation of the legs in response to position signals from the optically encoded screw drive motors, so that the motors operate in unison to raise and lower the microscope uniformly. The specimen to be examined can in fact consist of a portion of the substrate, and can therefore in principle be of any size or weight, such as the wing of an aircraft, or a desk top, for example. The base of the microscope preferably includes a middle bore 220 for extension of the sensor head to the specimen to be examined.

A scanner assembly shell 228 is preferably mounted to the upper side of the base. The upper end of the scanner shell assembly provides a site for mounting a pivot 234 for the body of the generally cylindrical inner sensor assembly, or kernel, which includes a laser light source and sensor head assembly 236.

The sensor head assembly 236 preferably includes an optical lever arm assembly 240 secured to the body of the inner sensor assembly, and preferably includes a half washer member 242 of magnetic steel, magnetically secured to a magnet 244 secured to the body of the inner sensor assembly. An integral cantilever support member 245 is mounted to a central portion of the half washer member, extending to the open middle portion of the half washer member. A reflective cantilever arm 246 formed in the shape of a triangle from first and second arms is secured at one end to the free end 247 of the integral cantilever support member and joined together at their free ends 250. Attached to the free end 250 of the cantilever arm is a probe means 260 including a distal needle-like probe tip 262 adapted to contact and follow the surface contours of the specimen.

A laser light source means 270 such as a laser diode with associated optics, is mounted in the upper portion of the body for producing a focused laser beam 272 directed at and deflected by the reflective cantilever arm. An opening 273 is provided in the removable base to allow the laser beam to pass through to the cantilever arm. A reflective means such as the planar mirror 280 is preferably mounted in the interior of the body at a distal end of an adjustment screw through a threaded access port (not shown) to reflect the deflected beam 286 to a photodetector 288 mounted to body for receiving the deflected laser beam.

As explained previously, with reference to FIGS. 2 and 9, the photodetector preferably generates an electrical output signal in response to the deflected laser beam indicative of the degree of deflection of the laser beam by the cantilever arm.

Figure 11:
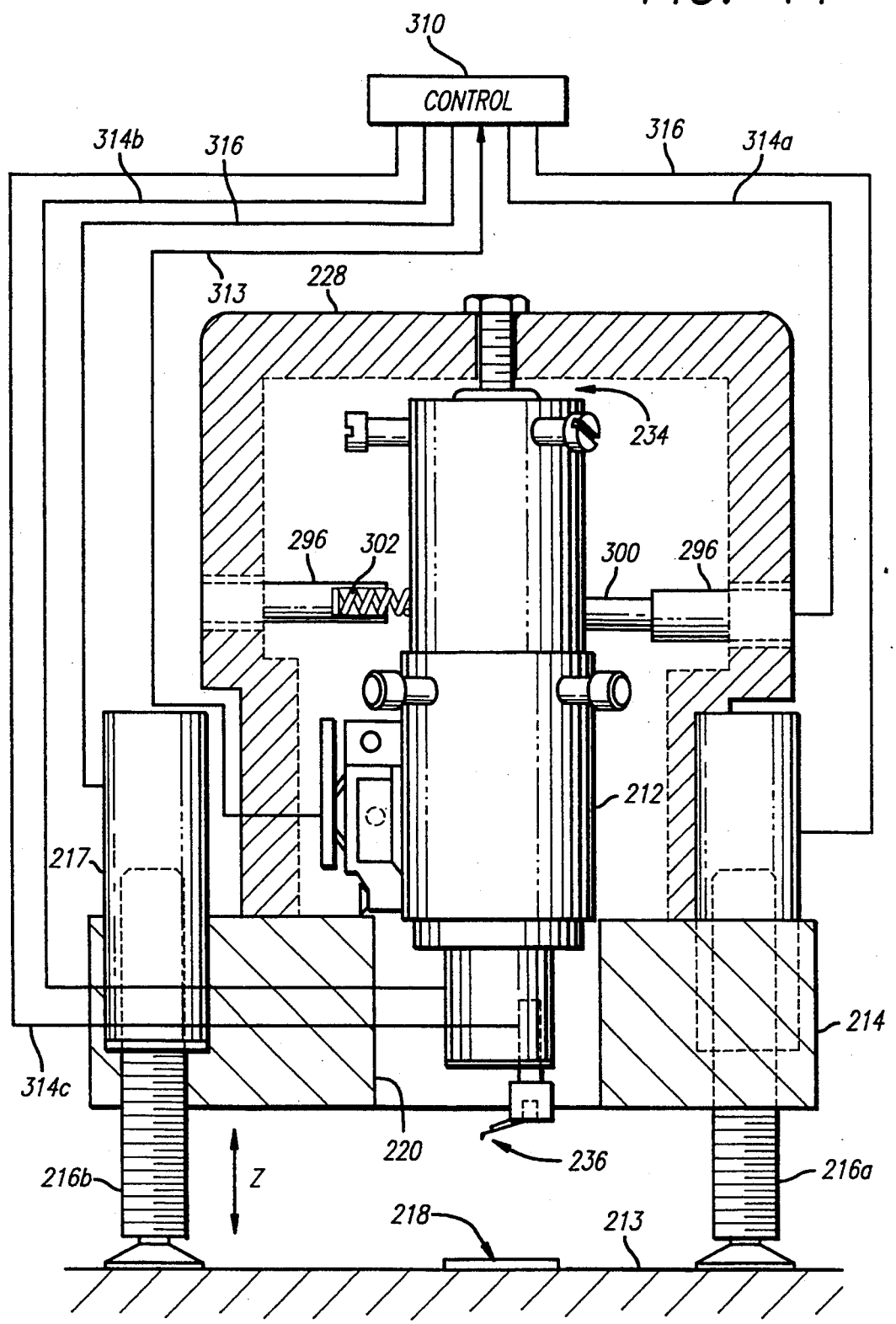
FIG. 11 is a diagrammatic side view of alternate embodiment of a synchronous sampling scanning force microscope of the invention placed on a substrate for examination.
Figure 12:
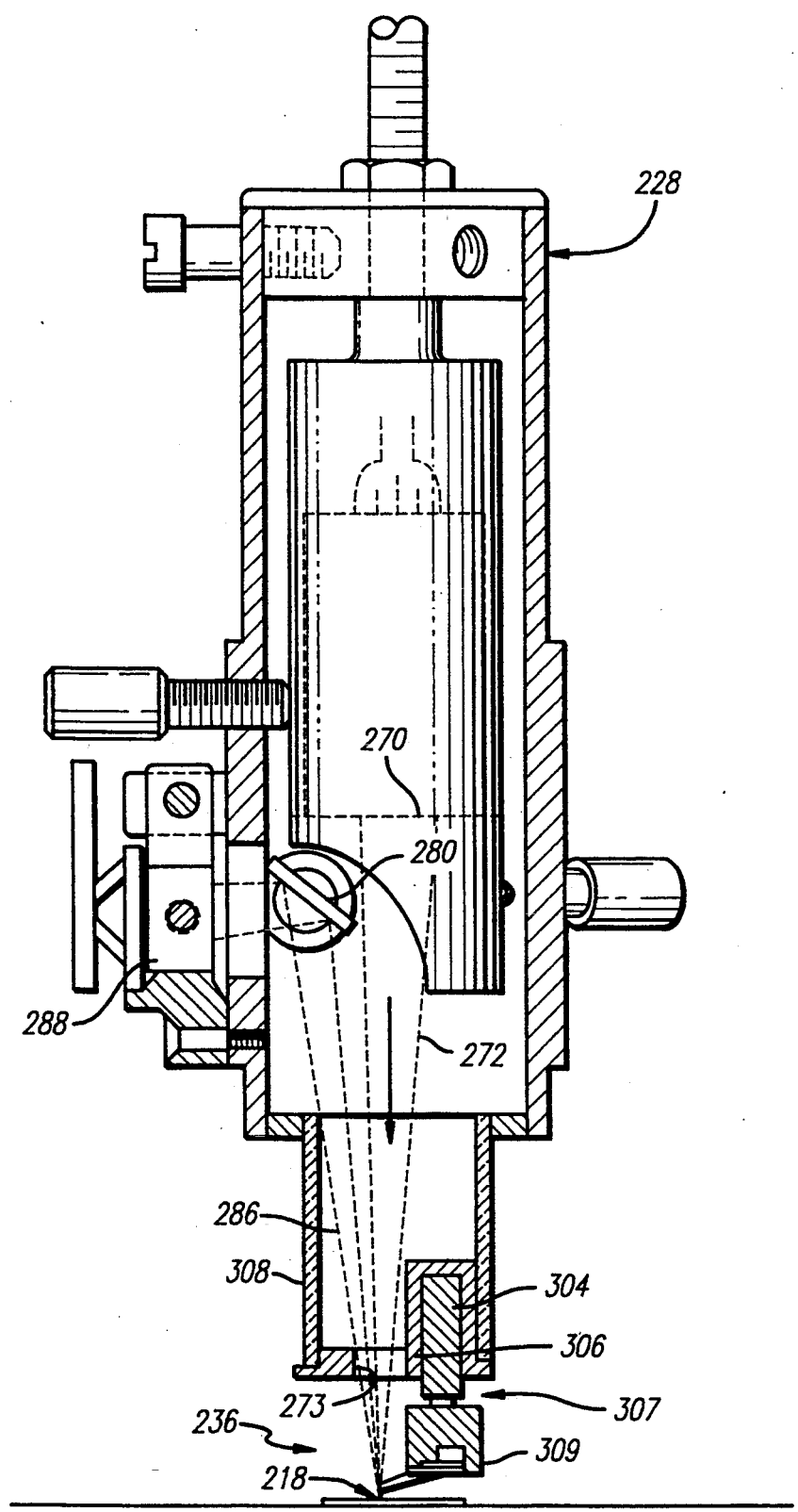
FIG. 12 is a cross-sectional elevational view of the synchronous sampling scanning force microscope of FIG. 11.
Figure 13:
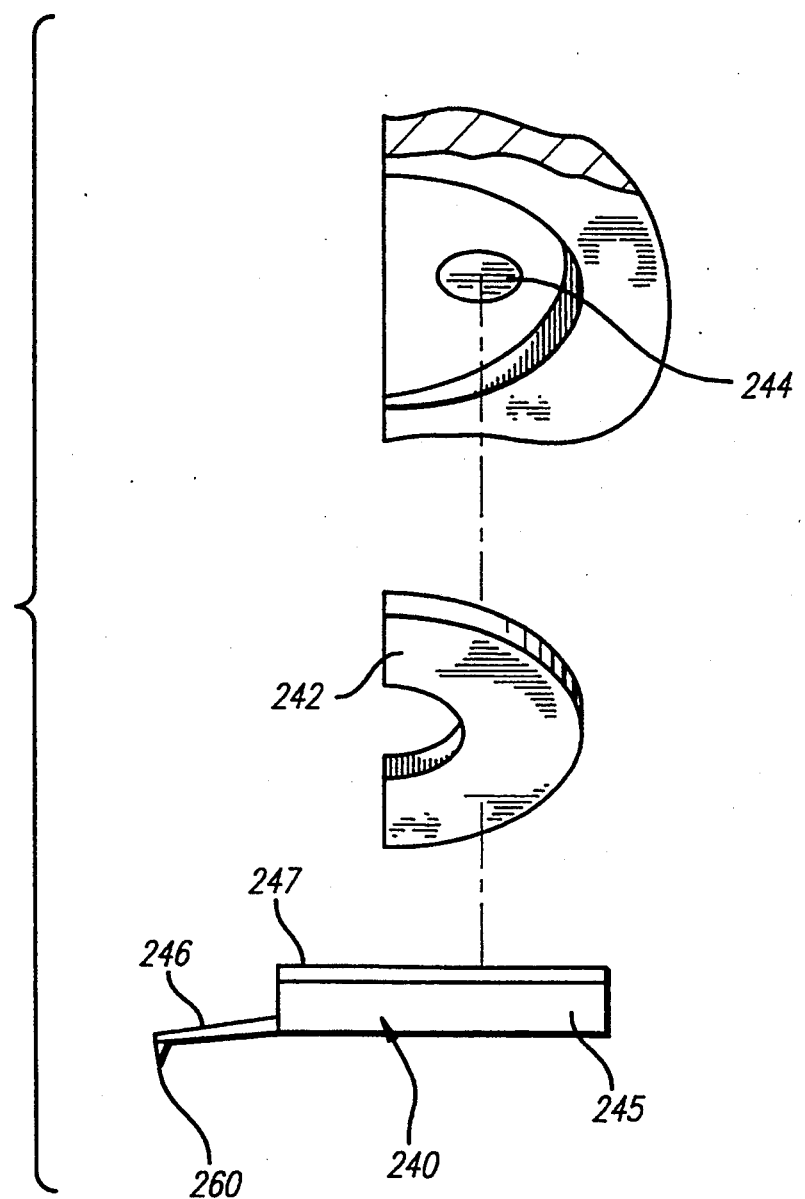
FIG. 13 is an enlarged, exploded view showing the mounting of the optical lever arm assembly of the scanning force microscope of FIG. 11.

Referring to FIGS. 11 and 12, the mechanism for raster scanning the sensor head preferably includes a pair of stacked piezo drivers 300 disposed in the scanner shell assembly oriented horizontally at right angles to each other for low resolution or large scale x and y raster scanning movements ranging approximately from zero to 200 microns, and corresponding opposing coil compression springs 302. The large motion horizontal piezo drivers 300 and the opposing coil springs are mounted between the inner scanner assembly and the scanner shell in push rods 296 having push rod chambers for containing and securing one end of the piezo drivers and springs. Large scale motion of the sensor head assembly in the vertical or Z dimension approximately from zero to 20 microns is controlled by a stacked piezo driver 304 mounted vertically in a holder 306 preferably formed of an insulating ceramic such as that sold under the trade name MACOR, available from Corning, mounted, for example by an adhesive such as epoxy, in a portion of a piezo tube driver 308, of the type which is well known in the art. The upper end of the piezo driver 304 is preferably adhesively secured to the holder such as by epoxy, and the lower end of the piezo driver 304 is preferably adhesively secured, such as by epoxy 307 to a sensor head mounting block 309, preferably formed of an insulating ceramic such as MACOR, to which the magnet of the sensor head assembly is secured. The range of motion of the stacked piezo drivers is of course dependent upon the piezo material selected and the length of the piezo stack. The piezo tube driver 308 is mounted to the lower end of the body of the inner sensor assembly, to provide for small scale x, y, and z motion of sensor head assembly. The small scale motion achievable with the piezo tube driver ranges approximately from zero to 5 microns in the vertical or z direction, and approximately from zero to 10 microns in the horizontal or x and y dimensions, depending upon the size of the cantilever arms of the sensor head assembly, typically with an atomic resolution as small as approximately 0.02 nm in the vertical dimension, and approximately 0.03 nm in the horizontal dimension.

The scanning means preferably also includes feedback control means 310 for driving the piezo tube in the vertical dimension as the probe tip traverses the contours of the specimen, to maintain a substantially constant force of the probe means against the surface of the specimen. The control means preferably comprises microprocessor means electrically connected to the photodetector means by line 313 to receive the output signals indicative of deflection of the laser beam from the optical lever arm means, and for generating the error signal indicative of a variance from the constant amount of force of the probe tip against the specimen surface. The control means is electrically connected to the piezoelectric drivers by control lines 314a-c for raising and lowering the sensor head assembly with respect to the specimen for increasing or decreasing the force of the probe tip against the specimen surface to maintain the substantially constant amount of force of the probe tip against the specimen surface, and for raster scanning the sensor head assembly in a horizontal plane in X and Y directions. The optically encoded screw drive motors 217 of the motor driven legs are also connected to the control means 310 by control lines 316 enabling the control means to receive the optically encoded position signals from the drive motors and to uniformly coordinate the operation of the drive motors in raising and lowering the microscope.

In the method of the invention for synchronous sampling scanning force microscopy, rather than quantifying the effect of the sample surface on the oscillating cantilever by averaging the amplitude changes or phase shifts over multiple cycles, each output signal cycle is sampled and stored as the surface of the specimen is scanned. The method thus involves sampling and storing amplitude change or phase shift for each cycle of oscillation of the oscillating cantilever probe of the synchronous sampling scanning force microscope. In the method, the free end of the cantilever arm of the microscope is oscillated to cause the probe tip to oscillate toward and away from the specimen surface at a desired frequency in cycles of near and far excursions of the probe tip relative to the specimen surface. As the free probe tip on the cantilever arm is driven vertically and laterally, the probe tip end has a generally sinusoidal motion. At or near the sample surface, when driven off resonance, the oscillation becomes asymmetrical, with the lower portions of the waveform representing the maximum near excursion of the probe tip relative to the surface of the specimen becoming flattened as the tip interacts with the surface. The detection scheme can work at any frequency, but is most effective at a high frequency other than the resonance frequency of the cantilever arm.

As noted above, operating a cantilever probe with a high Q factor at the resonance frequency in a "non-contact" mode can cause "ringing" problems, reducing frequency response, and the preferred operating frequency is below resonance frequency. For example, for a cantilever with a resonance frequency of 600 kHz, a suitable operating frequency would be about 500 kHz. The cantilever arm is typically oscillated at a frequency in the broad range of between about 5–500 kHz, and preferably at a frequency between about 80–250 kHz. The cantilever arm is typically driven to oscillate at an amplitude in the broad range of between about 2Å and 1000Å, and preferably at an amplitude between about 100Å and 1000Å at about 50–100 kHz, or at an amplitude between about 2Å and 10Å at about 5–500 kHz. The oscillating frequency of the cantilever is preferably selected to be different than the fundamental resonance frequency of the cantilever arm, and is most preferably lower than the fundamental frequency of the cantilever probe.

The motion of the cantilever arm is measured, and a deflection signal indicative of deflection of the cantilever arm is preferably generated by projection of a laser beam focused on the reflective cantilever arm, which reflects the beam to a photodetector which generates a deflection signal tracking the instantaneous deflection of the cantilever arm. Alternatively, the motion of the oscillating cantilever can also be measured by interferometric, capacitance, or piezo-resistive techniques, and other electrical means of detection, to measure the change in amplitude or phase.

Selected portions of cycles of the deflection signal corresponding to the cycles of near and far maximum excursions of the probe tip are sampled, preferably for generating amplitude signal data indicative of amplitude of the far and near excursions of the probe tip at the selected portions of the cycles. Although sampling of the amplitude of the deflection signal at a frequency different from the resonance frequency of the cantilever arm is currently preferred in non-contact and intermittent contact modes, in a non-contact mode of operation, it is also possible to sample selection portions of the cycles of the deflection signal for phase shift, at a constant amplitude. In sampling amplitude of the deflection signal the sampling interval, or dwell time, in each cycle is set to a small portion of the cycle, and in a currently preferred embodiment of the method of the invention, the amplitude is sampled for about 10% of the period of each cycle. For example, for a cantilever with a resonance frequency of 600 kHz driven at 500 kHz, the period would be 2 microseconds for each cycle, and the sampling period would be about 0.2 microseconds.

The amplitude of the deflection signal is preferably sampled at least at the far and near maximum excursions of the cantilever probe, although it is also possible to sample the deflection signal three or more times during each cycle for determination of compliance of the specimen surface, at a rate greater than the cantilever oscillation period. During normal amplitude sampling, the phase of sampling of the selected portions of cycles of the output signal is preferably controlled for sampling the amplitude of the deflection signal at intervals of 90° and 270° phases of each cycle, and the output amplitude signal for individual topographical data points for imaging the surface of the specimen is determined as the difference between measured amplitude at 90° and 270°. The amplitude difference output cancels small changes in the amplitude, and noise. In an intermittent contact mode, as the oscillating cantilever approaches the sample, the probe tip on the cantilever arm interacts with the forces at the surface of the specimen. Under these conditions, the cantilever interacts with the surface at the maximum near excursion of the cycle, reducing the amplitude. During the far excursion of the cycle, the energy transferred from the piezo driver is sufficient to return the cantilever to its maximum far excursion. The amplitude during the maximum excursion of the cantilever probe away from the sample surface can be considered as a reference to offset the signal contribution from the near excursion of the probe, and to cancel noise. The output amplitude signal data is preferably stored in a memory means, for use in displaying an image of the surface of the specimen.

Although the individual data points of the output amplitude signal are preferably used for high speed scanning and real time imaging of the surface of the specimen, for slower scan rates, successive data points may be grouped and averaged to generate amplitude signal data for displaying an image of the surface. Various techniques may be used for averaging the topographical data point, such as determining the root mean square of voltage of portions of the signal data, or averaging data points of a plurality of images on a pixel by pixel basis to generate amplitude signal data for displaying the image. Alternatively, the amplitude output signal data of multiple images can be averaged, pixel for pixel, for displaying an averaged image of the surface.

In the method of the invention, the deflection signal is also preferably used for generating a position feedback signal for positioning the probe tip a desired distance from the surface of the specimen, for maintaining the probe in an attractive region of the specimen surface, or for maintaining the probe in intermittent contact with the contamination layer.

It will be appreciated that the apparatus of the invention provides for a synchronous sampling scanning force microscope which can be used for high speed can and real time imaging of the surface of a specimen. The method of the invention provides for synchronous sampling of amplitude or phase shift of near and far excursions of an oscillated cantilever arm and probe tip oscillated at a frequency substantially different from the resonant frequency of the cantilever arm to permit such high speed scanning and real time imaging with unaveraged signal data with reduced noise and which avoids problems of differences in interaction of the probe tip with a surface contamination layer during near and far excursions of the probe tip relative to the surface of the specimen, by utilizing the interaction of the probe tip with the surface as a way of obtaining topographical surface data.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a synchronous sampling scanning force microscope for examining surface contours of a specimen, said specimen surface also having an attractive region and a repulsive region, said microscope having a body, a cantilever arm having a first end secured to said body and a free end, said cantilever arm having a fundamental resonance frequency, probe means secured to said free end of said cantilever arm and including a probe tip adapted to follow surface contours of the specimen, scanning means for mounting said specimen for examination by said microscope and adapted to scan said specimen relative to said body, deflection measuring means mounted to said body for measuring deflection of the cantilever arm and generating a deflection signal indicative of deflection of said cantilever arm, the improvement which comprises:

oscillator drive means connected to said cantilever arm for causing the cantilever arm and probe tip to oscillate toward and away from said specimen surface contours at a desired frequency in cycles of near and far excursions of said probe tip relative to said specimen surface;

sampling means for sampling selected portions of cycles of said deflection signal corresponding to said cycles of near and far excursions of said probe tip and for generating output signal data indicative of elevation of said surface contours of said specimen;

phase control means connected to said deflection measuring means for receiving said deflection signals, said phase control means being connected to said sampling means for controlling the sampling of said selected portions of cycles of said deflection signal; and means for storing said output signal data.

2. The microscope of claim 1, wherein said desired frequency of oscillation is different from the resonant frequency of the cantilever arm.

3. The microscope of claim 1, wherein said desired frequency of oscillation is a frequency less than the resonant frequency.

4. The microscope of claim 1, wherein said desired frequency of oscillation is a frequency between about 5-500 kHz.

5. The microscope of claim 1, wherein said desired frequency of oscillation is a frequency between about 80-250 kHz.

6. The microscope of claim 1, wherein said oscillator drive means is operative to drive said cantilever arm with an oscillation amplitude between about 2Å and 1000Å.

7. The microscope of claim 1, wherein said oscillator drive means is operative to drive said cantilever arm with an oscillation amplitude between about 100Å and 1000Å at about 50-100 kHz.

8. The microscope of claim 1, wherein said oscillator drive means is operative to drive said cantilever arm with an oscillation amplitude between about 2Å and 10Å at about 5-500 kHz.

9. The microscope of claim 1, wherein said sampling means is operative to sample measurements of amplitude of oscillation of said cantilever arm.

10. The microscope of claim 1, wherein said sampling means is operative to sample measurements of phase shift of oscillation of said cantilever arm.

11. The microscope of claim 1, further including probe position control feedback means for maintaining the probe in the attractive region of the specimen surface.

12. The microscope of claim 1, further including probe position control feedback means for maintaining the probe in intermittent contact with a contamination layer on the specimen surface.

13. The microscope of claim 1, wherein said sampling means includes means for sampling at a plurality of times during each cycle.

14. The microscope of claim 1, wherein said sampling means includes means for sampling at intervals of 90° and 270° phases of each cycle.

15. The microscope of claim 1, wherein said sampling means includes means for determining said output signal data as a difference between measured amplitude at 90° and 270°.

16. The microscope of claim 1, further including display means connected to said means for storing, for displaying an image of the surface of the specimen based upon said output signal data.

17. The microscope of claim 1, further including means for averaging successive output signal data to generate an image.

18. The microscope of claim 17, wherein said means for averaging comprises means for averaging a root mean square of voltage of said output signal data.

19. The microscope of claim 17, wherein said means for averaging comprises means for averaging output signal data of a plurality of images of the surface contours of a specimen.

20. The microscope of claim 1, wherein said sampling means includes means for generating a position feedback signal for positioning the probe tip a desired distance from the surface of the specimen.

21. A synchronous sampling scanning force microscope for examining surface contours of a specimen, said specimen surface also having an attractive region and a repulsive region, the microscope comprising:

a body, said body including a cantilever arm having a first end secured to said body and a free end, said cantilever arm having a fundamental resonance frequency;

probe means secured to said free end of said cantilever arm, said probe means including a probe tip adapted to follow the surface contours of the specimen with a substantially constant amount of force;

scanning means for mounting said specimen for examination by said microscope and adapted to scan said specimen relative to said body;

deflection measuring means for measuring motion of said cantilever arm and for generating an output signal indicative of an amount of deflection of said cantilever arm means;

oscillator drive means connected to said cantilever arm for causing the cantilever arm and probe tip to oscillate toward and away from said specimen surface contours at a desired frequency in cycles of near and far excursions of said probe tip relative to said specimen surface;

sampling means for sampling selected portions of cycles of said deflection signal corresponding to said cycles of near and far excursions of said probe tip and for generating output signals indicative of elevation of said surface contours of said specimen;

phase control means connected to said deflection measuring means for receiving said deflection signal and connected to said sampling means for controlling the sampling of said selected portions of cycles of said deflection signal; and memory means for storing said output signals.

22. The microscope of claim 21, wherein said means for measuring motion of said oscillating cantilever arm comprises laser light source means mounted to said body for producing a focused laser beam directed at and deflected by said cantilever arm, and photodetector means mounted to said body for receiving said laser beam deflected by said cantilever arm and generating said output signals.

23. The microscope of claim 21, wherein said desired frequency of oscillation is a frequency different from the resonant frequency of the cantilever arm.

24. The microscope of claim 21, wherein said desired frequency of oscillation is a frequency less than the resonant frequency.

25. The microscope of claim 21, wherein said desired frequency of oscillation is a frequency between about 5–500 kHz.

26. The microscope of claim 21, wherein said desired frequency of oscillation is frequency between about 80–250 kHz.

27. The microscope of claim 21, wherein said oscillator drive means is operative to drive said cantilever arm with an oscillation amplitude between about 2Å and 1000Å.

28. The microscope of claim 21, wherein said oscillator drive means is operative to drive said cantilever arm with an oscillation amplitude between about 100Å and 1000Å at about 50–100 kHz.

29. The microscope of claim 21, wherein said oscillator drive means is operative to drive said cantilever arm with an oscillation amplitude between about 2Å and 10Å at about 5–500 kHz.

30. The microscope of claim 21, wherein said sampling means includes means for sampling amplitude of oscillation of said cantilever arm.

31. The microscope of claim 21, wherein said sampling means includes means for sampling phase shift of oscillation of said cantilever arm.

32. The microscope of claim 21, wherein said sampling means includes dual sample and hold amplifiers.

33. The microscope of claim 21, wherein said sampling means includes a plurality of sample and hold amplifiers.

34. The microscope of claim 21, wherein said sampling means includes probe position control feedback means for maintaining the probe in the attractive region of the specimen surface.

35. The microscope of claim 21, wherein said sampling means includes probe position control feedback means for maintaining the probe in intermittent contact with a contamination layer on the specimen surface.

36. The microscope of claim 21, wherein said sampling means includes clock output means.

37. The microscope of claim 21, further including display means for displaying an image of the surface of the specimen based upon said output signals.

38. A method for synchronous sampling detection of an oscillating cantilever of a scanning force microscope for examining surface contours of a specimen, said microscope having a body, a cantilever arm having a first end secured to said body and a free end, said cantilever arm having a fundamental resonance frequency, probe means secured to said free end of said cantilever arm and including a probe tip adapted to follow the surface contours of the specimen with a substantially constant amount of force, scanning means for mounting said specimen for examination by said microscope and adapted to scan said specimen relative to said body, deflection measuring means for measuring deflection of said cantilever arm and for generating a deflection signal indicative of an amount of deflection of said cantilever arm, the method comprising:

oscillating said free end of said cantilever arm to cause the probe tip to oscillate toward and away from said specimen surface contours at a desired frequency in cycles of near and far excursions of said probe tip relative to said specimen surface;

sampling selected portions of cycles of said output signal corresponding to said cycles of near and far excursions of said probe tip and for generating output signal data indicative of relative elevation of said surface contours of said specimen;

controlling the sampling of said selected portions of cycles so that said sampling occurs during predetermined phases of each cycle of said deflection signal;

storing said output signal data; and displaying an image of said surface contours of said specimen based upon said output signal data.

39. The method of claim 38, wherein said step of oscillating said free end of said cantilever arm comprises oscillating the cantilever arm at a frequency between about 5–500 kHz.

40. The method of claim 38, wherein said step of oscillating said free end of said cantilever arm comprises oscillating the cantilever arm at a frequency between about 80–250 kHz.

41. The method of claim 38, wherein said step of oscillating said free end of said cantilever arm comprises driving oscillations of the cantilever arm at an amplitude between about 2Å and 1000Å.

42. The method of claim 38, wherein said step of oscillating said free end of said cantilever arm comprises driving oscillations of the cantilever arm at an amplitude between about 100Å and 1000Å at about 50–100 kHz.

43. The method of claim 38, wherein said step of oscillating said free end of said cantilever arm comprises driving oscillations of the cantilever arm at an amplitude between about 2Å and 10Å at about 5–500 kHz.

44. The method of claim 38, wherein said step of sampling selected portions of cycles of said deflection signal comprises sampling amplitude of said deflection signal.

45. The method of claim 38, wherein said step of sampling selected portions of cycles of said deflection signal comprises sampling phase shift of said deflection signal.

46. The method of claim 38, wherein said step of sampling selected portions of cycles of said deflection signal comprises sampling amplitude of said deflection signal for about 10% of the period of each cycle.

47. The method of claim 38, wherein said step of sampling selected portions of cycles of said deflection signal comprises sampling amplitude of said deflection signal at a plurality of times during each cycle.

48. The method of claim 38, wherein said step of sampling selected portions of cycles of said output signal comprises sampling amplitude of said deflection signal at intervals of 90° and 270° phases of each cycle.

49. The method of claim 38, wherein said output signal data is determined as the difference between measured amplitude at 90° and 270°.

50. The method of claim 38, further including the step of averaging successive output signal data to generate topographical data for displaying said image.

51. The method of claim 38, further including the step of averaging the root mean square of said output signal data to generate topographical data for displaying said image.

52. The method of claim 38, further including the step of averaging output signal data of a plurality of images on a pixel by pixel basis to generate topographical data for displaying an averaged image of said surface contours of specimen.

53. The method of claim 38, further including the step of generating a position feedback signal based upon said deflection signal for positioning the probe tip a desired distance from the surface of the specimen.

54. The method of claim 38, further including the step of generating a probe position feedback signal based upon said deflection signal for maintaining the probe in an attractive region of the specimen surface.

55. The method of claim 38, further including the step of generating a probe position feedback signal based upon said deflection signal for maintaining the probe in intermittent contact with a contamination layer on the specimen surface.

56. In a scanning force microscope for examining surface contours of a specimen, said microscope having a body, a deflection arm having a first end secured to said body and a free end, said deflection arm having a fundamental resonance frequency, probe means secured to said free end of said deflection arm and including a probe tip adapted to follow the surface contours of the specimen, scanning means for mounting said specimen for examination by said microscope and adapted to scan said specimen relative to said body, and deflection measuring means mounted to said body for measuring motion of the deflection arm and generating a deflection signal indicative of deflection of said deflection arm, the improvement which comprises:

oscillator drive means connected to said deflection arm for causing deflection arm and the probe tip to oscillate toward and away from said specimen surface contours at a desired frequency in cycles of near and far excursions of said probe tip relative to said specimen surface;

sampling means for sampling selected portions of cycles of said output signal corresponding to said cycles of near and far excursions of said probe tip and for generating output signals representing deflection of said near and far excursions of said probe tip at said selected portions of said cycles;

control means connected to said deflection measuring means for receiving said deflection signal and connected to said sampling means for controlling the sampling of said selected portions of cycles of said deflection signal; and means for storing said output signals.

57. A method for examining surface contours of a specimen using a scanning force microscope, said microscope having a body, a deflection arm having a first end secured to said body and a free end, said deflection arm having a fundamental resonance frequency, probe means secured to said free end of said deflection arm and including a probe tip adapted to follow surface contours of the specimen, scanning means for mounting said specimen for examination by said microscope and adapted to scan said specimen relative to said body, and deflection measuring means mounted to said body for measuring motion of the deflection arm and generating a deflection signal indicative of an amount of deflection said deflection arm, the steps of the method comprising:

oscillating said free end of said deflection arm to cause the probe tip to oscillate toward and away from said specimen surface contours at a desired frequency in cycles of near and far excursions of said probe tip relative to said specimen surface;

sampling selected portions of cycles of said output signal corresponding to said cycles of near and far excursions of said probe tip and for generating output signal data representing deflection of said near and far excursions of said probe tip at said selected portions of said cycles;

controlling the sampling of said selected portions of cycles so that said sampling occurs during predetermined phases of each cycle of said deflection signal; and storing said output signal data.

* * * * *

UNITED STATES PATENT AND TRADEMARK OFFICE
CERTIFICATE OF CORRECTION

PATENT NO. : 5,406,832
DATED : April 18, 1995
INVENTOR(S) : Ronald C. Gamble et al.

It is certified that error appears in the above-indentified patent and that said Letters Patent is hereby corrected as shown below:

Column 9, line 52, change " $\text{delta } f = F \times f(res)/2k$ " to
-- delta f = F' x f(res)/2k --.

Signed and Sealed this

Tenth Day of October, 1995

Attest:

BRUCE LEHMAN

Attesting Officer

Commissioner of Patents and Trademarks